July 22, 1952 — R. G. HOARE — 2,604,320
SHOCK ABSORBER
Filed Jan. 24, 1949
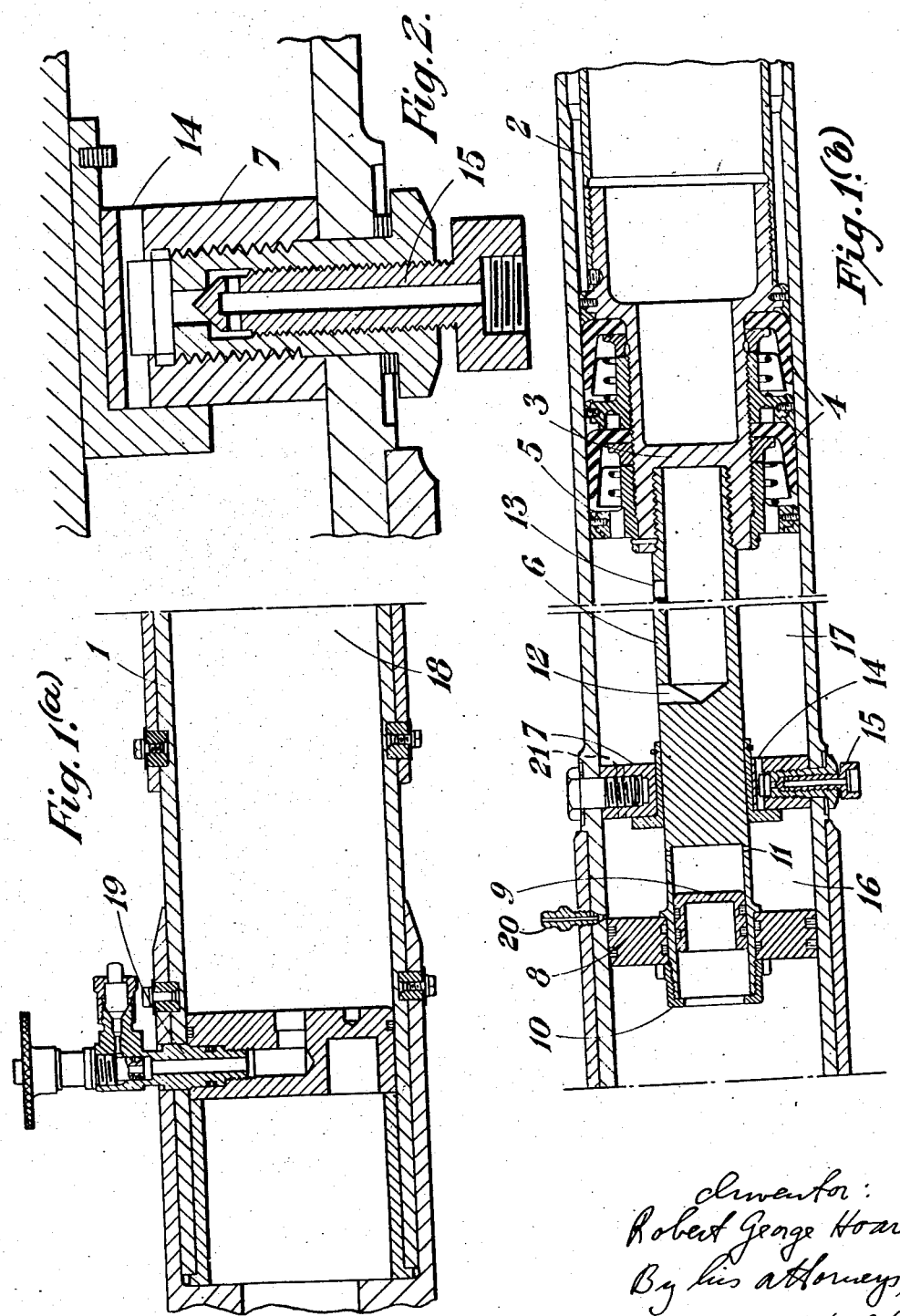
Inventor:
Robert George Hoare,
By his Attorneys,
Baldwin & Wight Patented July 22, 1952

2,604,320

UNITED STATES PATENT OFFICE 2,604,320

SHOCK ABSORBER

Robert George Hoare, Warrington, England, assignor to Electro-Hydraulics Limited, Warrington, England, a company of Great Britain Application January 24, 1949, Serial No. 72,476
In Great Britain January 29, 1948

6 Claims. (Cl. 267—64)

This invention relates to shock absorbers.

Shock absorbers are well known in which in the cylinder there is provided a ported diaphragm, a main piston on one side of the diaphragm and a counter piston rod passing through the diaphragm to a counter piston on the other side of the diaphragm, the space between the pistons being filled with liquid. In one such arrangement it has generally been the custom to provide in the cylinder, above the counter piston, a certain amount of liquid, the rest of the cylinder space being filled with a gas such as air. It has been found in practice that such constructions were not entirely satisfactory, and the counter piston has been provided with valves so as to regulate the transfer of liquid from one side of the counter piston to the other, and vice versa. This construction, however, has led to disadvantages in that on the compression stroke, the liquid from the underside of the counter piston when being moved into the space above the counter piston was moved with such a force that it tended to emulsify with the air in the cylinder space, thus making the performance of the shock absorber unpredictable; great difficulty has been encountered due to this fact, and the compression ratio of the shock absorber tended to be erratic. It is the main object of this invention to provide a shock absorber in which such disadvantages are not obtained, that is to say to provide an arrangement in which the emulsification of the liquid in the air is prevented.

A shock absorber according to the present invention comprises a cylinder in which slides a piston assembly including a main piston and piston rod, a counter piston and counter piston rod, and a ported diaphragm fixed in said cylinder, which diaphragm separates the main piston from the counter piston, which counter piston separates the liquid space from a further compression space, the counter piston rod having therein a floating piston which acts as a compensator for a change in volume of liquid due to temperature changes. The compression space in the cylinder is preferably charged with gas under pressure, for example air, although said space may be occupied by any suitable spring means such as a solid spring of the rubber or coiled type or a bellows device or both.

The counter piston rod is bored at its inner end to house the floating piston, which may, if desired, be biassed into one predetermined position, which is retained therein by a suitable stop, for example, a bored nut screwed to the counter piston rod, the bore of the nut being less in diameter than the bore of the counter piston rod; the outer end of the counter piston rod may also be bored and provided at each end of said bore with one or more apertures so that, during movement of the sliding piston assembly, liquid may pass over a certain portion of the travel of said assembly through the counter piston rod from one side of the fixed diaphragm to the other, or vice versa.

One form of construction according to the present invention is shown diagrammatically in the accompanying drawing in which Figure 1a is a fragmentary longitudinal section of one end of a shock absorber embodying the invention, Figure 1b is a longitudinal section of the other end thereof, and Figure 2 a detailed view to an enlarged scale.

Referring to the drawing the shock absorber comprises an outer cylinder 1 and an inner cylinder 2, which inner cylinder forms a hollow piston rod carrying the main piston 3 with a suitable gland 4 and guide bush 5, the said piston carrying a counter piston rod 6 which passes through a diaphragm 7 fixed in the outer cylinder, and terminates in a counter piston 8. The inner end of the counter piston rod is bored to form a compensator cylinder receiving a floating piston 9 which is prevented from being forced out of the counter piston rod by a bored nut 10 secured at the end of said rod, the bored counter piston rod being provided with apertures 11 between the counter piston and the fixed diaphragm. The lower or outer end of the counter piston rod is also formed with an internal bore and provided with apertures 12, 13 spaced apart longitudinally of said counter piston rod, the purpose of which apertures will become apparent. The diaphragm 7 is secured in a fluid-tight manner in the outer cylinder and is provided with apertures 14, some or all of which may be valved so as to allow flow of liquid from the one side to the other of the diaphragm, and a permanently open rebound orifice 21. When valves are employed these are preferably of the flap valve type, the movement of which may be limited by, for example, a circlip. The diaphragm is also provided with a liquid filling orifice closable by screwed plugs 15 (Figure 2) by which liquid can be introduced to the space 16 between the counter piston and the diaphragm, and the space 17 between the diaphragm and the main piston. The air in the liquid space can be bled off by a bleed screw 20. The space 18 in the cylinder between the head of the counter piston and the inner end of the cylinder is filled with air under pressure supplied through a suitable inflation valve 19. Finally the floating piston 9 may be biassed into one predetermined position for example by a spring, not shown.

The shock absorber works in the following manner: Assuming the shock absorber to be extended and load is applied to close the shock absorber, the closing force is resisted on inward movement of the sliding piston assembly 2, 3, 4, 5, partially by the liquid between the main piston 3 and the diaphragm 7 due to the damping of the apertures 14 in the diaphragm between the spaces 16, 17, and partially by straining the spring in the space 18 between the counter piston 8 and the inner end of the cylinder, that is to say by the compressed air. The floating piston 9 in the bored counter piston rod it will be appreciated plays no part in resisting the closing force and acts as a compensator for any change of volume of the liquid due to temperature changes.

When the external load causing the compression of the shock absorber is removed, the air spring in space 18 will cause or assist in extension of the shock absorber. This occurs because the spring acts on the full area of the counter piston 8 which is thus moved to the right (Figure 1) causing the fluid in the space 16 to return to the space 17 through the apertures 14. The floating piston 9 may also be moved in the same direction as the counter piston to assist operation and when flap valves are used in conjunction with the apertures 14, these will close part of said apertures during the extension, also leaving open the rebound orifice 21.

What I claim is:

1. A shock absorber comprising a cylinder, a piston assembly slidable therein, said assembly including a main piston and main piston rod connected thereto, a counter piston and counter piston rod connected to said main piston rod, a ported diaphragm fixed in said cylinder and separating the main piston from the counter piston and through which said counter piston rod extends, liquid substantially filling the spaces between said diaphragm and said main piston and said counter piston respectively, said counter piston separating the liquid space in the cylinder from a further space containing a compressible medium substantially free from contact with said liquid, a compensator cylinder in said counter piston rod communicating respectively with said further space and with said liquid containing space between said diaphragm and said counter piston, and a floating piston within said compensator cylinder between its points of communication with said further space and said liquid containing space for acting as a compensator for changes in the volume of fluid due to temperature changes.

2. A shock absorber as claimed in claim 1 in which said compressible medium is constituted by a compressible gas.

3. A shock absorber as claimed in claim 1 in which a stop is provided for retaining said floating piston in said compensator cylinder.

4. A shock absorber as claimed in claim 1 in which the counter piston rod is formed and an internal bore and with at least one aperture at each end of said internal bore to allow passage of liquid through the counter piston rod from one side of the fixed diaphragm to the other over a predetermined portion of the travel of the sliding assembly.

5. A shock absorber comprising a cylinder, a piston assembly in said cylinder, said assembly including a main piston rod, a main piston on said rod, a counter piston rod connected to said main piston rod, and a counter piston on said counter piston rod, said pistons being spaced longitudinally of said cylinder and slidably engaging the interior thereof, a diaphragm fixed in said cylinder between said pistons, said diaphragm having ports therethrough permitting restricted communication between the two sides thereof and having an orifice in which said counter piston rod is slidably received, a compressible medium in said cylinder on the side of said counter piston opposite from said main piston, a compensator cylinder in said counter piston rod, a floating piston in said compensator cylinder, means providing communication between the end of said first-mentioned cylinder containing said compressible medium and said compensator cylinder on one side of said floating piston, means providing communication between said compensator cylinder on the other side of said floating piston and the space between said main and counter pistons, said last-mentioned space and said compensator cylinder on the side of said floating piston adjacent said last-mentioned space being filled with liquid, said floating piston being movable in response to changes in volume of said liquid, and said counter piston and floating piston preventing passage of liquid from the liquid filled space to the portion of said first-mentioned cylinder containing said compressible medium.

6. A shock absorber as claimed in claim 5 in which said main piston and said counter piston are the same in diameter.

ROBERT GEORGE HOARE.

REFERENCES CITED

The following references are of record in the file of this patent:

UNITED STATES PATENTS

| Number | Name | Date |
| --- | --- | --- |
| 1,759,674 | Wallace | May 20, 1930 |
| 1,886,712 | Messier | Nov. 8, 1932 |
| 1,984,144 | Laugaudin | Dec. 11, 1934 |